May 24, 1966 R. I. NAGEL 3,253,276
SIGNAL LANTERN LENS

Filed Dec. 19, 1963 3 Sheets-Sheet 1

INVENTOR.
ROBERT I. NAGEL
BY Arthur Jacob
ATTORNEY

May 24, 1966 R. I. NAGEL 3,253,276
SIGNAL LANTERN LENS

Filed Dec. 19, 1963 3 Sheets-Sheet 2

INVENTOR.
ROBERT I. NAGEL
BY *Arthur Jacob*
ATTORNEY

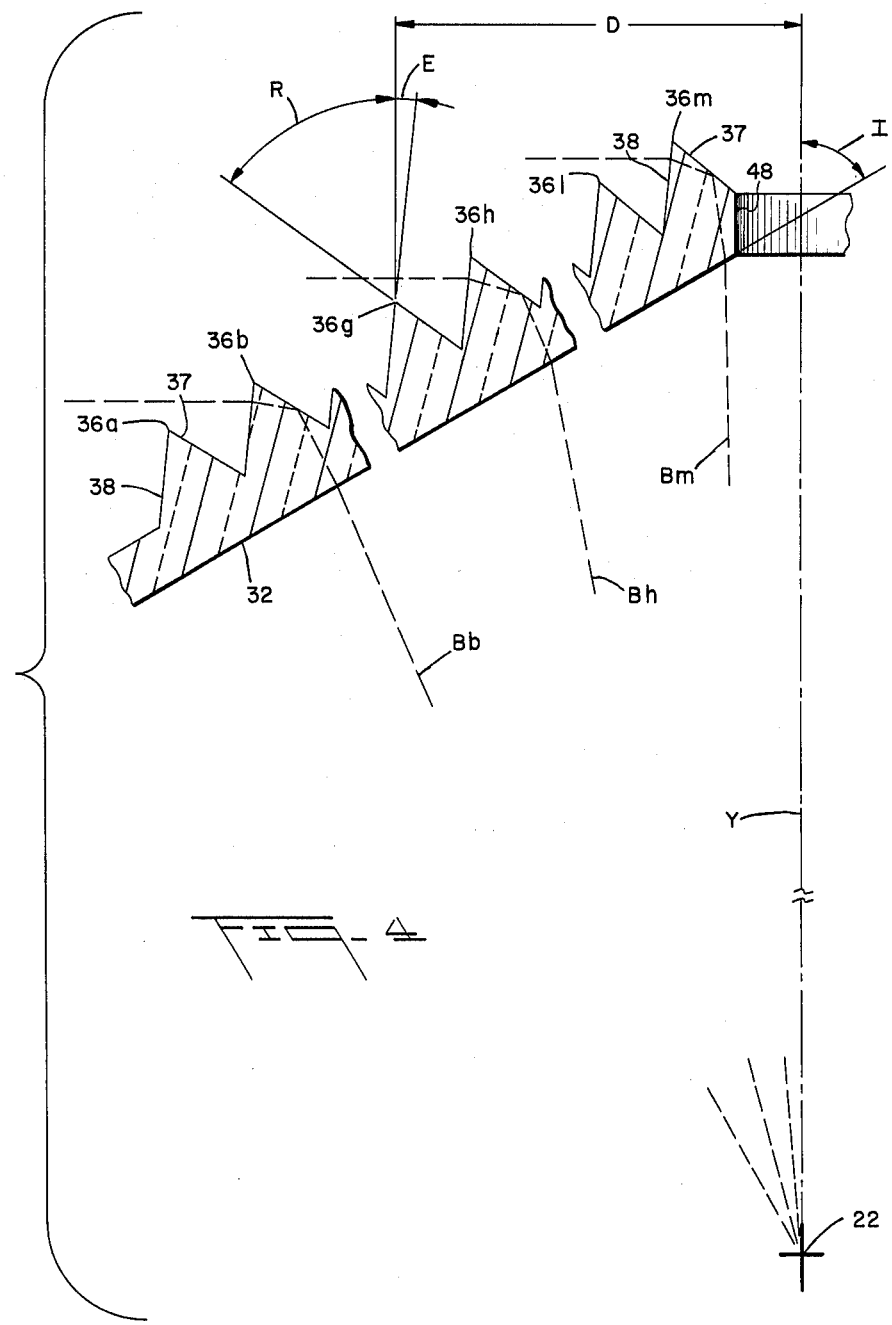

United States Patent Office 3,253,276
Patented May 24, 1966

3,253,276
SIGNAL LANTERN LENS
Robert I. Nagel, Skokie, Ill., assignor to Elastic Stop Nut Corporation of America, Union, N.J., a corporation of New Jersey
Filed Dec. 19, 1963, Ser. No. 331,679
10 Claims. (Cl. 340—383)

The present invention relates generally to lenses and pertains, more specifically, to supplementary lenses for use in increasing the effectiveness and efficiency of lanterns capable of projecting a visible signal into a predetermined area.

A variety of signal lanterns are currently available which make use of a point source of light and a lens assembly so located relative to the source as to be capable of projecting a visual signal into a predetermined area. Among such lanterns are minor light devices, generally employed on buoys, beacons, channel lights, aviation obstructions and like installations where the display of visual signals is an effective means for warning of hazards and aiding navigation. These devices are generally omnidirectional; that is, they usually project a signal visible about the entire horizon and ordinarily employ a drum-shaped lens known as a "drum-type" lens in conjunction with a point source of light to provide the omnidirectional signal.

Since drum-type lenses are generally cylindrical or frusto-conical in form, all of the light emanating from the point source, which is usually located along the central axis of the lens, will not be intercepted by the lens elements, some of the light being allowed to pass through the ends of the cylindrical or frusto-conical configuration without forming a part of the projected signal. While such light is ordinarily a minor portion of the light provided by the source, it is never-the-less a significant amount of light which could be utilized to increase the efficiency of the device, as well as the effectiveness of the signal, if the incorporation of such light into a usable signal could be accomplished without requiring a complex, relatively expensive optical system.

It is therefore an important object of the invention to provide a simple yet effective means for improving the efficiency of a signal lantern by directing ordinarily unused light found in such a lantern into a usable signal.

Another object of the invention is to provide a simplified signal lantern assembly having a minimum number of component parts for establishing a visual signal utilizing the maximum amount of light available from a source within the lantern.

Still another object of the invention is to provide means for accepting light which is not intercepted by a drum-type lens in a signal lantern and directing such accepted light into a visual signal projected into a predetermined area.

A further object of the invention is to provide an improved signal lantern construction having improved performance characteristics and marked economies of operation, without sacrificing economy of manufacture.

The invention may be described briefly as a supplementary lens which finds use in a lantern capable of projecting a visible signal into a predetermined area, the lantern having a point source of light and an open-ended, vertically extending drum-shaped lens for intercepting a portion of the light emanating from the source and projecting that portion into a first horizontally beamed signal. In using the supplementary lens, the lens may be placed adjacent the open end of the drum-shaped lens to intercept a further portion of the light emanating from the source and passing through the open end and project the further portion into a second horizontally beamed signal, the supplementary lens having a plurality of catadioptric lens elements located outwardly in increasing increments of distance with respect to the source so as to direct the further portion of the light into the second horizontally beamed signal. The supplementary lens has a central axis which is coincident with the central axis of the drum-shaped lens, when in use, and a light receiving surface capable of refracting rays of the further portion of light. The catadioptric lens elements are located in a surface opposite to the light receiving surface, each element being displaced radially from the central axis and axially from the source such that the element which lies the greatest radial distance from the central axis is axially nearest the source and each successive element nearer the axis is axially further from the source than a preceding element, each of the elements including a light emitting surface and a total light reflecting surface, the reflecting surfaces being so positioned as to intercept the refracted rays and reflect those rays toward the light emitting surfaces. The light emitting surfaces are substantially parallel and each reflecting surface is inclined relative to the central axis such that the inclination of the reflecting surface of each successive element radially nearer the central axis is less than the inclination of the reflecting surface of a preceding element so as to reflect the refracted rays at predetermined angles to the light emitting surfaces so that the light emitting surfaces project substantially radial rays into the second radially beamed visible signal. Means may be included for locating and securing the lens in position to so locate the elements.

The novel features of the invention both as to its structure and method of operation will be more fully understood and additional objects and advantages thereof will become apparent in the following detailed description of an embodiment of the invention illustrated in the accompanying drawings in which:

FIGURE 4 is a fragmentary diagrammatic illustration showing details of the supplementary lens elements.

Figure 1:
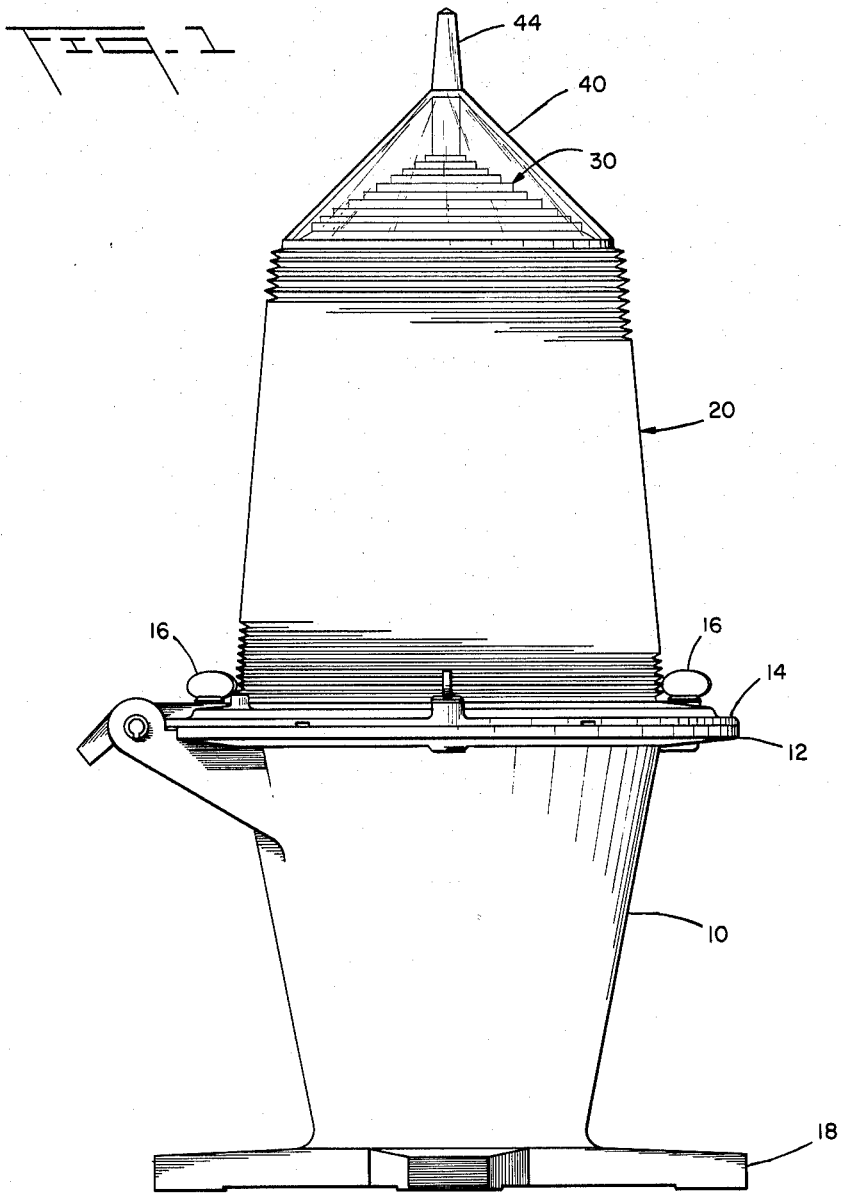
FIGURE 1 is an elevational view of a signal lantern constructed in accordance with the invention.

Referring now to the drawings, a signal lantern incorporating a construction contemplated by the invention is illustrated in FIGURE 1. The signal lantern has a base member 10 provided with an upper flange 12 for supporting a lens assembly retaining ring 14 which is removably fixed in place upon the upper flange 12 by a plurality of winged screw members 16. A lower flange 18 is provided for mounting the lantern upon a support member at an installation site.

Figure 2:
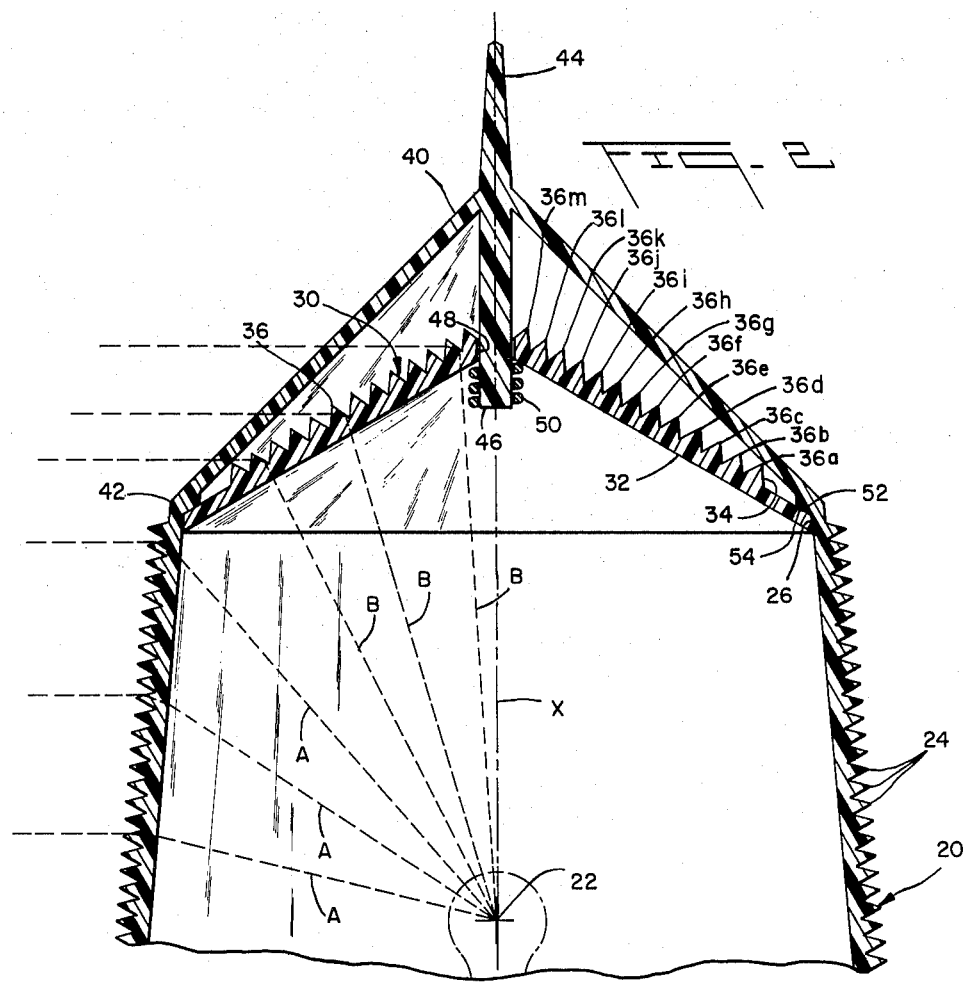
FIGURE 2 is a partially diagrammatic, enlarged cross-sectional detail of the upper portion of the lantern of FIGURE 1.

The lantern of FIGURE 1 is designed and constructed to establish a signal visible about the entire horizon, and to that end incorporates a vertically extending drum-type lens 20 which is drum-shaped and is removably fixed to the base member 10 by the lens assembly retaining ring 14 in a known manner. As seen in FIGURE 2, a light source 22 is provided at a point lying along the central vertical axis X of the drum-type lens 20, the source ordinarily being the filament of an electrically operated light bulb, and a plurality of horizontally disposed, ring-like dioptric lens elements 24 are provided in the outer surface of the drum-type lens to intercept a portion of the light emanating from the source, as illustrated by dashed lines A representing the intercepted light rays, and direct that portion into a horizontally beamed signal visible about the entire periphery of the lantern.

Because drum-type lenses are generally cylindrical or frusto-conical in form and of finite axial extent, and the lens elements in the surface of these lenses must terminate at the axial extent of the lens, such lenses may be said to be "open-ended" in an optical sense, even though some sort of physical closure may be placed adjacent at least one end, as will be explained hereinafter. Thus, in FIGURE 2, drum-type lens 20 extends vertically until lens elements 24 terminate at open end 26 and a further portion of the light emanating from the source 22, rays of which further portion of light are depicted by dashed lines B, will not be intercepted by drum-type lens 20, but will pass through the open end 26. In conventional lanterns of the type illustrated, such light becomes stray light and ordinarily serves no useful purpose in providing the desired signal.

Recognizing that a more effective signal could be established and a more efficient use of the light available at the source could be realized economically if a relatively simple and inexpensive means were made available for intercepting the ordinarily unused portion of light in a conventional lantern and directing such light into a desired signal, I have devised such an easily fabricated and readily installed means. As best seen in FIGURE 2, the means includes a supplementary lens 30 which is placed within the open end 26 of the drum-type lens and has a light receiving surface 32 for accepting the portion of light which is not intercepted by the drum-type lens 20 and which passes through open end 26. The opposite surface 34 of the lens 30 is provided with a plurality of catadioptric lens elements 36 which are so formed and oriented as to direct the portion of light (depicted by dashed lines B) intercepted by lens 30 into a horizontally beamed signal which is shown complementary to the horizontally beamed signal projected by the drum-type lens 20.

Figure 3:
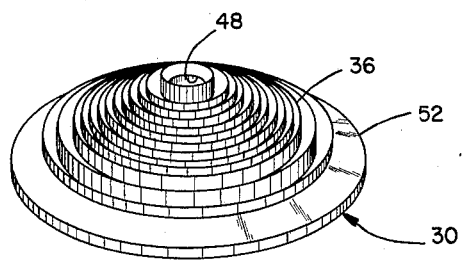
FIGURE 3 is a perspective illustration of a supplementary lens constructed in accordance with the invention and appearing in FIGURES 1 and 2.

Referring now to FIGURES 2, 3 and 4 catadioptric lens elements 36 are seen to be ring-like elements of different diameters, each element lying in a radial plane with the centers of all of the elements lying along the central axis Y of the lens 30, which axis coincides with the central axis X of the drum-type lens 20. The radial planes are axially displaced from one another such that the largest diameter element $36a$ lies in a plane nearest the source 22 and each element of successively smaller diameter is displaced axially further from the source than a preceding element of larger diameter; thus, element $36b$ is axially further from source 22 than radially more distant element $36a$, element $36c$ is axially further than radially more distant element $36b$, and each element $36d$, $36e$, $36f$, $36g$, $36h$, $36i$, $36j$, $36k$, $36l$, $36m$, of successively smaller diameter and radially nearer the central axis Y, is displaced axially further from source 22 than a preceding element $36c$, $36d$, $36e$, $36f$, $36g$, $36h$, $36i$, $36j$, $36k$, and $36l$, respectively of larger diameter. In this manner, each catadioptric lens element 36 is capable of intercepting and directing light emanating from the source without interference from the remaining catadioptric lens elements and the sum of the light projected by all of the elements 36 establishes a horizontally, or radially, beamed signal obtained from light which would have otherwise been of no use in such a signal. The large angles through which rays B are redirected in order to project the ordinarily unused light into a horizontally beamed signal are realized by taking advantage of the internal reflective capabilities of the catadioptric lens elements, as illustrated diagrammatically in FIGURES 2 and 4, rather than merely relying upon the refractive capabilities of ordinary dioptric lens elements. Thus, each catadioptric lens element 36 is provided with a total light reflecting surface 37 (see FIGURE 4) which is so positioned as to intercept rays of light which impinge upon light receiving surface 32 and which are refracted by surface 32, and reflect these refracted rays toward a light emitting surface 38 where the rays may again be refracted to be projected into a generally radially beamed signal.

In order to attain the optimum performance concomitant with realistic manufacturing costs, it is necessary to carefully ascertain the values of the different parameters which are capable of being varied in the construction of a lens employing the teachings of the invention. In general, the more simple the overall configuration, the more economical will be the fabrication of the lens. Enlarged fragments of the lens of the illustrated embodiment are shown in FIGURE 4 in such a way that these parameters may be clearly pointed out. For simplicity, light receiving surface 32 has a straight line profile and is inclined with respect to the central axis Y at an angle I, surface 32 thus being conical and lending a generally conical configuration to the entire lens. The light emitting surfaces 38 are parallel to one another and very nearly vertical, these surfaces 38 preferably making a small angle E with the vertical in order to facilitate manufacture. It will be evident that each ray emanating from the source 22 and striking the light receiving surface 32 will strike that surface at a different angle of incidence. Thus, rays $Bb$, $Bh$ and $Bm$ are shown striking surface 32 at different angles; however, each of these rays is redirected by catadioptric lens elements $36b$, $36h$ and $36m$, respectively, so as to be projected from light emitting surfaces 38 in generally parallel, radial directions. In order to compensate for the different angles of incidence and still attain the desired final direction in the rays with maximum effectiveness, the inclination of reflecting surfaces 37 to the vertical (and to the central axis Y), as represented by angle R, varies from element to element such that the inclination of the reflecting surface of each successive element radially nearer the axis is less than the inclination of the reflecting surface of a preceding element; that is, angle R in element $36h$ is less than angle R in element $36g$, element $36h$ being displaced a lesser radial distance D from the central axis Y than element $36g$. Likewise, the inclination of reflecting surface 37 of element $36a$ is greater than that of the reflecting surface of element $36b$, and so on all the way to element $36m$. Thus, the rays refracted by light receiving surface 32 and intercepted by the reflecting surfaces 37 are reflected at predetermined angles toward light emitting surfaces 38 so that the light emitting surfaces can project substantially radial rays into a radially beamed visible signal.

A specific example of a lens of the invention has been constructed with the following typical dimensions:

Overall diameter _____ inches__ 5
Angle of inclination of light receiving surface (angle I) _____ 60°

| Catadioptric Element (36) | Angle of Light Reflecting Surface Angle R | Angle of Light Emitting Surface, Angle E | Radial Distance D (inches) |
| --- | --- | --- | --- |
| 36a | 59°25′ | 5°00′ | 2.055 |
| 36b | 58°25′ | 5°00′ | 1.891 |
| 36c | 57°30′ | 5°00′ | 1.730 |
| 36d | 56°35′ | 5°00′ | 1.572 |
| 36e | 55°45′ | 5°00′ | 1.416 |
| 36f | 54°55′ | 5°00′ | 1.263 |
| 36g | 54°05′ | 5°00′ | 1.111 |
| 36h | 53°20′ | 5°00′ | 0.962 |
| 36i | 52°35′ | 5°00′ | 0.814 |
| 36j | 51°55′ | 5°00′ | 0.670 |
| 36k | 51°15′ | 5°00′ | 0.527 |
| 36l | 50°35′ | 5°00′ | 0.386 |
| 36m | 50°00′ | 5°00′ | 0.247 |

It will be apparent that lens 30 is easily fabricated in a simple unitary structure and is readily assembled with the drum-type lens 20 to form a lens assembly of minimum complexity and maximum efficiency. Consistent with the objective of reducing structural complexity, a simple means has been devised for locating and securing the lens 30 adjacent the open end 26 of drum-type lens 20 and will now be explained.

Since signal lanterns of the type illustrated are generally installed at sites where the lanterns are exposed to the extremes of weather and other conditions concomitant with outdoor use, it is advisable to provide a protective cover over the top of the lantern, thus not only closing the open end of the drum-type lens 20, but protectively encasing the lens 30. To this end, a transparent, conical cover 40 is provided at the top of the lantern and is shown in FIGURES 1 and 2 in the preferred arrangement wherein the base 42 of cover 40 is integral with the drum-type lens 20 at open end 26 and extends upwardly to culminate in a spike 44 at the apex of the cover. The provision of a spike 44 at the apex of the cover 40 has been found to effectively defeat the employment of the cover as a perch for birds, thus eliminating one source of annoyance in maintaining the lantern clean during service. By extending the root of spike 44 axially downwardly, a downward projection 46 is established integral with cover 40 and a convenient structural member is thus made available, which member is capable of extending through an aperture 48 provided in the apex of the conical lens 30 and receiving a fastening device, shown in the form of a wire nut 50, to secure the lens 30 in place. The lens 30 is axially located with respect to the drum-type lens 20 and the source 22 by virtue of flange 52 of the lens 30 seating against shoulder 54 of the cover 40, and radially located by having the overall diameter of lens 30 correspond to the diameter of open end 26 of the drum-type lens 20, as well as by the cooperation of projection 46 with aperture 48.

The illustrated construction is readily fabricated in the minimum number of component parts. The drum-type lens 20 and cover 40 are preferably molded in a unitary structure, thus attaining accuracy in the relative location of lens elements 24, projection 46 and shoulder 54, thereby assuring proper location of the lens 30, which is preferably molded separately, upon assembly of the two component parts into an integrated lens assembly. The component parts are preferably molded of a clear methylmethacrylate resin, such as "Plexiglas," manufactured by the Rohm and Haas Corporation, or Du Pont's "Lucite." The accuracy with which such materials may be molded not only allows a reduction in the number of component parts, but eliminates major finishing operations and facilitates ease of assembly. Thus, the incorporation of lens 30 within a lantern as shown becomes not only economically feasible, but highly desirable in increasing the operating efficiency of signal lanterns while still maintaining manufacturing economy.

While in the illustrated embodiment the ordinarily unused portion of light is shown redirected to complement the primary horizontal signal projected by the drum-type lens and thus vertically enlarge the visible signal, it is apparent that the catadioptric elements and their component portions could be so oriented as to redirect such light to supplement the primary signal and increase its intensity, rather than its extent. In either arrangement, a more efficient use of the light emanating from the source is realized.

It is to be understood that the above detailed description of an embodiment of the invention is presented by way of example only and is not intended to restrict the invention. Various details of design and construction may be modified without departing from the true spirit and scope of the invention as defined in the appended claims.

I claim:

1. A supplementary lens for use in a lantern which projects a visible signal into a predetermined area, the lantern including a point source of light and an open-ended, vertically extending drum-shaped lens having lens elements for intercepting a portion of the light emanating from the source and projecting said portion into a first horizontally beamed signal, said supplementary lens being adjacent the open end of the drum-shaped lens for intercepting a further portion of the light emanating from the source and passing through the open end to project said further portion into a second horizontally beamed signal, said supplementary lens having a plurality of catadioptric lens elements located outwardly in increasing increments of distance with respect to the source so as to direct said further portion of the light into said second horizontally beamed signal, and means for locating and securing said lens in position to so locate said elements.

2. The supplementary lens of claim 1 having a generally conical configuration, the central axis of which lies along the vertical direction, and said catadioptric lens elements being ring-like elements, the center of each said element lying on said central axis.

3. The supplementary lens of claim 2 wherein said means comprises an aperture at the apex of said conical configuration, a projection fixed in relation to said drum-type lens in position to pass through said aperture, and a fastening device cooperating with said projection and the conical lens to fix the conical lens at said location.

4. A supplementary lens for use in a lantern which projects a visible signal into a predetermined area, the lantern including a point source of light and a generally cylindrical, open-ended, axially extending lens having lens elements for intercepting a portion of the light emanating from the source and projecting said portion into a first radially beamed signal, said supplementary lens being adjacent the open end of the cylindrical lens for intercepting a further portion of the light emanating from the source and passing through the open end to project said further portion into a second radially beamed signal, said supplementary lens having:
  (A) a central axis coincident with the central axis of the cylindrical lens;
  (B) a light receiving surface capable of refracting rays of said further portion of the light;
  (C) an opposite surface having a plurality of catadioptric lens elements, each element being displaced radially from the central axis and axially from the source such that the element which lies the greatest radial distance from the central axis is axially nearest the source and each successive element nearer the axis is axially further from the source than a preceding element, each of said elements including a light emitting surface and total light reflecting surface, the reflecting surfaces being so positioned as to intercept said refracted rays and reflect the rays toward the light emitting surfaces;
  (D) each of said light emitting surfaces being substantially parallel and each reflecting surface being inclined relative to the central axis such that the inclination of the reflecting surface of each successive element radially nearer the central axis is less than the inclination of the reflecting surface of a preceding element so as to reflect the refracted rays at predetermined angles to the light emitting surfaces so that the light emitting surfaces project substantially radial rays into said second radially beamed visible signal;
and means for locating and securing said supplementary lens adjacent the open end.

5. The supplementary lens of claim 4 wherein said catadioptric lens elements and ring-like elements of different diameters, each said element lying in a radial plane with the centers of said elements lying along the central axis, the radial planes being axially displaced from one another such that the largest diameter element lies in a plane nearest the source and each element of successively smaller diameter is displaced axially further from the source than a preceding element of larger diameter.

6. The supplementary lens of claim 5 having a generally conical configuration symmetric about the central axis, said light receiving surface being a continuous conical surface.

7. The supplementary lens of claim 6 wherein said means comprises an aperture at the apex of said conical configuration, a projection fixed in relation to said cylindrical lens in position to pass through said aperture, and a fastening device cooperating with said projection and the conical lens to fix the conical lens at said location.

8. A lens for accepting at least a portion of light emanating from a point source located along the central axis of the lens and axially displaced therefrom, and directing such a portion of light into a radially beamed visible signal, said lens having:
 (A) a light receiving surface capable of refracting rays of said accepted portion of light;
 (B) an opposite surface having a plurality of catadioptric lens elements, each element being displaced radially from the source such that the element which lies the greatest radial distance from the central axis is axially nearest the source and each successive element radially nearer the axis is axially further from the source than a preceding element, each of said elements including a light emitting surface and a total light reflecting surface, the reflecting surfaces being so positioned as to intercept said refracted rays and reflect the rays toward the light emitting surfaces; and
 (C) each of said light emitting surfaces being substantially parallel and each reflecting surface being inclined relative to the central axis such that the inclination of the reflecting surface of each successive element radially nearer the axis is less than the inclination of the reflecting surface of a preceding element so as to reflect the refracted rays at predetermined angles to the light emitting surfaces so that the light emitting surfaces project substantially radial rays into said radially beamed signal.

9. The lens of claim 8 wherein said catadioptric lens elements are ring-like elements of different diameters, each said element lying in a radial plane with the centers of said elements lying along the central axis, the radial planes being axially displaced from one another such that the largest diameter element lies in a plane nearest the source and each element of successively smaller diameter is displaced axially further from the source than a preceding element of larger diameter.

10. The lens of claim 9 having a generally conical configuration symmetric about the central axis, said light receiving surface being a continuous conical surface.

References Cited by the Examiner
UNITED STATES PATENTS

| | | | |
|---|---|---|---|
| 1,589,370 | 6/1926 | Conover | 240—106.1 |
| 1,922,618 | 8/1933 | Dickson | 340—383 |
| 1,948,555 | 2/1934 | Wood | 240—106 |
| 2,017,052 | 10/1935 | Bartow | 340—25 |
| 2,219,016 | 10/1940 | Parssberg | 240—29 |
| 2,290,100 | 7/1942 | Goris | 240—106 X |
| 2,586,375 | 2/1952 | Pennow | 240—37.1 |

NEIL C. READ, *Primary Examiner.*

W. GLEICHMAN, I. J. LEVIN, *Assistant Examiners.*